3,187,051
**PROCESS FOR THE PREPARATION OF UNSYM-
METRICAL DIALKYL HYDRAZINES**
Gene V. Mock, Haddonfield, N.J., assignor to E. I. du
Pont de Nemours and Company, Wilmington, Del., a
corporation of Delaware
No Drawing. Filed Feb. 10, 1956, Ser. No. 564,641
6 Claims. (Cl. 260—583)

The present application is a continuation-in-part of my copending application, Serial No. 481,488, filed January 12, 1955, now abandoned.

The present invention relates to a process for the production of useful substituted hydrazines and, more particularly, to a process for the production of unsymmetrical dialkyl hydrazines.

Dialkyl hydrazines, which are useful as fuels, as intermediates for chemical syntheses, and the like, have been produced previously from dialkyl nitrosamines by chemical reduction. A novel process for the production of the dialkyl nitrosamines wherein secondary amines are treated with a mixture of nitrogen dioxide and nitric oxide has been described previously in my co-pending application, Serial No. 413,725, filed March 2, 1954, now abandoned. However, the known methods which employ chemical agents to reduce the unsymmetrical dialkyl nitrosamines to unsymmetrical dialkyl hydrazines have had the serious disadvantage from the commercial point of view that they require the use of expensive reducing agents such as metallic zinc in acetic acid. More recently, the use of another costly chemical reducing agent, lithium aluminum hydride, has been proposed for the reduction of the dialkyl nitrosamines. Heretofore, attempts to prepare unsymmetrical disubstituted hydrazines from the corresponding nitrosamines by catalytic hydrogenation have met with essentially no success. Paal and Yao (Chem. Ber. 63B, 65 (1930)) hydrogenated di-n-propylnitrosamine in the presence of a palladium-on-calcium carbonate catalyst but found that reduction had occurred only to the very slight extent of 3.7% even after the nitrosamine-catalyst mixture had been agitated with hydrogen for a very extended period of time (154 hours). More recently, Grillot (J. Am. Chem. Soc. 66, 2124 (1944)) obtained only diphenylamine and ammonia when he hydrogenated diphenylnitrosamine in the presence of either Raney nickel or Adams platinum oxide catalyst. Hence, the need long has been recognized for a process whereby dialkyl nitrosamines could be converted to useful unsymmetrical dialkyl hydrazines in a simple, direct, and relatively inexpensive manner.

Accordingly, an object of the present invention is to provide a simple, direct process for the production of unsymmetrical dialkyl hydrazines. Another object of the present invention is to provide an efficient and economically feasible process for the conversion of dialkyl nitrosamines to useful unsymmetrical dialkyl hydrazines. Other objects will become apparent as the invention is further described.

I have found that the foregoing objects can be achieved when a dialkyl nitrosamine is hydrogenated in the presence of a catalyst selected from carbon-supported platinum, palladium, or rhodium metal.

In accordance with the process of the present invention, a dialkyl nitrosamine, e.g., dimethylnitrosamine or diethylnitrosamine, is hydrogenated in the presence of a catalyst selected fom carbon-supported platinum, palladium, or rhodium metal at a superatmospheric hydrogen pressure, the reaction mixture during the hydrogenation being maintained at a temperature between about 20° C. and about 75° C.

The following examples serve to illustrate specific embodiments of the method of carrying out the process of the present invention, but they will be understood to be illustrative only and not to limit the invention in any way. The parts given in the examples are parts by weight. The percent conversions to the desired hydrazines reported in the examples are based on the amounts of the hydrazines obtained, compared with the amounts theoretically obtainable from the quantities of dialkyl nitrosamines charged.

*Example 1*

Two parts of a 10% palladium-on-carbon catalyst was added to a shaker bottle provided with heating means and containing 10 parts of diethylnitrosamine dissolved in 122 parts of 95% ethanol. The shaker bottle was evacuated and then filled with hydrogen to a pressure of 4 atmospheres. After the system had reached equilibrium, shaking was started and continued until the reaction mixture, which was maintained at a temperature of about 33° C. during the shaking, no longer took up hydrogen. The catalyst then was removed by filtration, the filtrate was acidified with hydrochloric acid, and the ethanol was removed by evaporation under vacuum. The hydrochloride residue was made basic by the addition of aqueous sodium hydroxide, and the aqueous portion was subjected to ether extraction. The ether solution obtained was dried, the ether was removed by distillation, and the distillation residue was dried. Fractionation of the residue gave 4.4 parts of diethylhydrazine, a conversion of 50%.

*Example 2*

The method of Example 1 was employed in the preparation of the diethylnitrosamine-catalyst solution, the following quantities (parts) being used: diethylnitrosamine, 5; ethanol, 122; and 10% palladium-on-carbon, 1. The hydrogenation was carried out in a high-pressure shaker apparatus provided with heating means. An initial hydrogen pressure of 68 atmospheres and a temperature of about 50° C. was used. After hydrogen uptake ceased, the catalyst was removed. The product mixture then was analyzed by a titration method, and diethylhydrazine was determined to be present in the mixture in the amount of 3.2 parts. This corresponded to a conversion of 72%.

*Example 3*

The following runs were made according to the method of the foregoing examples, and in each case, the analytical method of Example 2 was used in the determination of the quantity (parts) of diethylhydrazine present in the product mixture.

| Run | Diethyl-nitrosamine (parts) | Catalyst | | 95% C₂H₅OH solvent (parts) | Hydrogenation temperature (°C.) | Initial hydrogen pressure (atm.) | Diethylhydrazine produced | |
|---|---|---|---|---|---|---|---|---|
| | | Type | Parts | | | | Parts | Percent conversion |
| A | 5 | 5% Pd-on-C | 2 | 61 | 60 | 66 | 3.1 | 71 |
| B | 10 | 5% Pd-on-C | 2 | 122 | 35 | 4 | 5.3 | 60 |
| C | 10 | 10% Pd-on-C | 2 | 122 | 28 | 4 | 6.2 | 70 |
| D | 5 | 10% Pd-on-C | 1 | 61 | 56 | 100 | 2.8 | 64.5 |
| E | 10 | 5% Pd-on-C | 2 | 122 | 76 | 4 | 4.2 | 47.2 |
| F | 5 | 5% Pd-on-C | 1 | 61 | 150 | 100 | 0.61 | 13.8 |

*Example 4*

Fifteen parts of dimethylnitrosamine dissolved in 200 parts of 95% ethanol and 4 parts of a 10% palladium-on-carbon catalyst were charged to the low-pressure shaker bottle employed in Example 1. After evacuation of the shaker, hydrogen was introduced to a pressure of about 3.5 atmospheres. Shaking was started after equilibrium was reached and was continued until the mixture no longer took up hydrogen. During the shaking, the temperature of the mixture increased from about 28 to about 46° C. After hydrogen uptake had ceased, the catalyst was removed by filtration. A conductometric analysis of the ethanol filtrate revealed that the filtrate contained 2.6 parts of unsymmetrical dimethylhydrazine.

*Example 5*

The method of Example 1 was used in the preparation of a diethylnitrosamine-catalyst solution; the following quantities (parts) were employed: diethylnitrosamine, 20; 50% methanol, 137; 10% palladium-on-carbon, 2. The solution was charged to a low-pressure hydrogenation bomb of the type used in the run of Example 1. The bomb then was evacuated, pressurized with hydrogen to about 3.5 atmospheres, and after equilibrium was reached, shaking was started. The reaction temperature was maintained at about 60° C. during the hydrogenation. After 2.5 hours, hydrogen uptake ceased. The catalyst was removed from the mixture by filtration, and analysis of the product showed it to contain 10.9 parts of diethylhydrazine, a conversion of 62.1%. When a 150-part aliquot of the product mixture was distilled, 99.4% of the diethylhydrazine shown by analysis to be present in the product was recovered. The distilled diethylhydrazine was identified by preparation of its oxalate salt, M.P. 136–137° C.

*Example 6*

One hundred-fifty parts of water containing 15 parts of dimethylnitrosamine and 1 part of 10% palladium-on-carbon was charged to the low-pressure hydrogenation bomb used in the run of Example 5. The procedure and work-up of Example 5 were followed except that the reaction temperature was maintained at 45° C. during the hydrogenation. Hydrogen adsorption ceased after 4 hours. Analysis of the product showed it to contain 8.8 parts (59.7% conversion) of unsymmetrical dimethylhydrazine. Eighty percent of the dimethylhydrazine shown by analysis to be present was recovered when an aliquot of the product was distilled as in Example 5. The oxalate of the dimethylhydrazine had a melting point of 146–147° C.

*Example 7*

Dimethylnitrosamine, 15 parts, and 10% platinum-on-carbon, 1 part, in 150 parts of water were charged to the low-pressure bomb, and the procedure of Example 5 was followed. The reaction temperature was maintained at 45° C., and after 2.75 hours, hydrogen uptake ceased. Analysis of the product after removal of the catalyst showed it to contain 12.1 parts of dimethylhydrazine, a conversion of 81.7%.

*Example 8*

A high-pressure autoclave of the type used in Example 2 (except that the external heating means was omitted) was charged with a solution of 7.5 parts of dimethylnitrosamine and 0.1 part of 5% rhodium-on-carbon in 40 parts of water. An initial hydrogen pressure of about 66 atmospheres was used, and, during the hydrogenation, the reaction temperature ranged from 27 to 30° C. Hydrogen absorption ceased after 2 hours. Analysis of the filtered product mixture indicated that it contained 4.6 parts (62% conversion) of dimethylhydrazine. Seventy-eight percent of the dimethylhydrazine shown by analysis to be present was recovered when an aliquot of the product was distilled.

*Example 9*

The following runs record attempts to use as catalysts in the present process materials other than carbon supported platinum, palladium or rhodium metal catalysts such as are employed in the foregoing examples. In each run, the method of the preceding examples was followed, and the analytical procedure of Example 2 was used in the determination of the quantity of diethylhydrazine formed.

| Run | Diethyl-nitrosamine (parts) | Catalyst | | 95% C₂H₅OH solvent (parts) | Hydrogenation temperature (°C.) | Initial hydrogen pressure (atm.) | Diethylhydrazine produced | |
|---|---|---|---|---|---|---|---|---|
| | | Type | Parts | | | | Parts | Percent conversion |
| A | 5 | Platinum dioxide. | 0.1 | 61 | 50 | 35 | 0 | 0 |
| B | 10 | 5% palladium-on-alumina. | 2 | 122 | 29 | 4 | 1.4 | 16.2 |
| C | 10 | Raney nickel | 1 | 122 | 28 | 4 | 0 | 0 |
| D | 5 | ___do___ | 1.5 | 61 | 26 | 66 | 0 | 0 |

The good yields of the dialkyl hydrazines obtained in Examples 1 to 8, wherein the hydrogenations were effected in the presence of catalysts consisting of carbon-supported platinum, palladium, or rhodium metal, are entirely surprising in view of the fact that none or very little of the desired disubstituted hydrazines were obtained when other common hydrogenation catalysts were employed both in the runs of Example 9 and in prior practice. Thus, the use of a carbon-supported platinum, palladium, or rhodium metal catalyst, which is a critical feature of the process of the present invention, makes possible for the first time the production of dialkyl hydrazines in good yields by hydrogenation of the corresponding dialkyl nitrosamines and hence constitutes a very great advance over the known methods for obtaining unsymmetrical disubstituted hydrazines from disubstituted nitrosamines.

The foregoing examples also show that the hydrogenations of the present process are preferably carried out at a superatmospheric hydrogen pressure, preferably at a superatmospheric hydrogen pressure of at least 3 atmospheres but, as a comparison of the examples and particularly the runs of Example 3 shows, the choice of pressure above the preferred minimum level is not critical in the process of the invention. The preceding examples additionally show that the present process is operable when the reaction mixture is held between about 20° C. and about 75° C. during the hydrogenation. As Runs E and F in Example 3 illustrate, temperatures above 75° C. lead to an undesirable drop in the yields of the disubstituted hydrazines. The present process, as is illustrated in the foregoing, is also preferably carried out in the presence of a solvent in which the dialkyl nitrosamines are freely soluble, such as water, a low-molecular-weight alkanol, an alkanol-water mixture, a lower dialkyl ether, or the like.

Hydrogen uptake ceased within from 2 to 10 hours with the carbon-supported platinum, palladium, or rhodium metal catalysts of the present invention, depending upon the conditions of the reaction generally. For example, in the case of the run illustrated in Example 2, hydrogen uptake ceased after 3.5 hours, whereas in Run A of Example 3, the hydrogen uptake did not cease until 10 hours had elapsed. In each case, the conversion of the desired diethylhydrazine was above 70%. Therefore, the time required for the completion of the reaction is not critical in the present process.

The process of the present invention is not limited to the materials employed in the foregoing examples. For example, other dialkyl nitrosamines, such as di-n-propylnitrosamine or diisobutylnitrosamine, can be used in the present process in place of the dimethylnitrosamine or diethylnitrosamine utilized in the examples. By the term "alkyl" in the present invention is contemplated not only the alkyl radicals derived from saturated aliphatic hydrocarbons of the generic formula $C_nH_{2n+2}$ but also those radicals derived from saturated cyclic aliphatic hydrocarbons represented by the formula $C_nH_{2n}$. Preferably, however, the present process is applied to dialkyl nitrosamines in which the alkyl radicals are derived from saturated aliphatic hydrocarbons of the two foregoing types wherein $n$ is 1 to 6.

The invention has been described in detail in the foregoing. However, it will be apparent that many variations are possible without departing from the spirit and scope of the invention. I intend, therefore, to be limited only by the following claims.

I claim:

1. A process for the production of an unsymmetrical dialkyl hydrazine which comprises hydrogenating dialkyl nitrosamine, wherein the alkyl groups each contain from 1 to 6 carbon atoms, in the presence of a metal catalyst selected from the group consisting of platinum, palladium, and rhodium, on a carbon support, said hydrogenation being effected at a superatmospheric hydrogen pressure and the reaction mixture during said hydrogenation being maintained at a temperature between about 20° C. and about 75° C.

2. A process for the production of an unsymmetrical dialkyl hydrazine which comprises preparing a solution of a dialkyl nitrosamine, wherein the alkyl groups each contain from 1 to 6 carbon atoms, by dissolving said nitrosamine in a solvent selected from water, a low-molecular-weight alkanol, and an alkanol-water mixture, adding to said solution, a metal catalyst selected from the group consisting of platinum, palladium, and rhodium, on a carbon support; and thereafter hydrogenating said dialkyl nitrosamine by introducing into said solution hydrogen gas at a superatmospheric hydrogen pressure of at least 3 atmospheres, the reaction mixture during said hydrogenation being maintained at a temperature between about 20° C. and about 75° C.

3. A process for the production of unsymmetrical dimethylhydrazine which comprises preparing a solution of dimethylnitrosamine, by dissolving said dimethylnitrosamine in a solvent selected from water, a low-molecular-weight alkanol, and an alkanol-water mixture; adding to said solution a metal catalyst selected from the group consisting of platinum, palladium, and rhodium, on a carbon support; and thereafter hydrogenating said dimethylnitrosamine by introducing into said solution hydrogen gas at a superatmospheric hydrogen pressure of at least 3 atmospheres, the reaction mixture during said hydrogenation being maintained at a temperature between about 20° C. and about 75° C.

4. A process for the production of unsymmetrical diethylhydrazine which comprises preparing a solution of diethylnitrosamine by dissolving said diethylnitrosamine in a solvent selected from water, a low-molecular-weight alkanol, and an alkanol-water mixture; adding to said solution a metal catalyst selected from the group consisting of platinum, palladium, and rhodium, on a carbon support; and thereafter hydrogenating said diethylnitrosamine by introducing into said solution hydrogen gas at a superatmospheric hydrogen pressure of at least 3 atmospheres, the reaction mixture during said hydrogenation being maintained at a temperature between about 20° C. and about 75° C.

5. A process for the production of an unsymmetrical dialkyl hydrazine which comprises hydrogenating a dialkyl nitrosamine, wherein the alkyl groups each contain from 1 to 6 carbon atoms, in the presence of a carbon-supported palladium catalyst, said hydrogenation being effected at a superatmospheric hydrogen pressure of more than 3 atmospheres and at a temperature between about 20° C. and 75° C.

6. The process of claim 5 wherein the nitrosamine is dimethylnitrosamine.

References Cited by the Examiner

UNITED STATES PATENTS

| | | | |
|---|---|---|---|
| 2,688,040 | 8/54 | Adams et al. | 260—569 |
| 2,768,878 | 10/56 | Passino | 260—583 |
| 2,802,031 | 8/57 | Horvitz | 260—583 |

FOREIGN PATENTS

| | | |
|---|---|---|
| 552,147 | 3/43 | Great Britain. |
| 797,483 | 7/58 | Great Britain. |

OTHER REFERENCES

Blatt: Organic Synthesis, Collective Volume II, 1943, pages 211–213.

Ellis: Hydrogenation of Organic Substances, 3rd edition, 1930, page 87.

Fieser et al.: Advanced Organic Chemistry, 1961, page 281.

Fischer: Berichte, vol. 8, 1875, pages 1587–90.

Gilman: Organic Chemistry, vol. 1, 2nd edition, 1943, pages 780, 781, 786, 787.

Grillot: J.A.C.S., vol. 66, 1944, page 2124.

Groggins: Unit Processes in Organic Synthesis 4th edition, 1952, pages 519, 520.

Lieber et al.: J.A.C.S., vol. 59, p. 1834 (1937).

Paal et al.: Chem. Berichte, vol. 63B, 1930, pages 57–60.

Paal et al.: Chem. Berichte, vol. 63B, 1930, page 65.

Wieland: "Die Hydrazine," Verlag von Ferdinand Enke, Stuttgart, 1913, page 32.

CHARLES B. PARKER, *Primary Examiner.*

R. L. CAMPBELL, L. D. ROSDOL, H. J. LIDOFF,
*Examiners.*